May 26, 1959 C. W. GARBUTT 2,887,791
TOPOGRAPHICAL MAP AND METHOD OF MAKING SAME
Filed Feb. 13, 1956 2 Sheets-Sheet 1

INVENTOR.
CAMERON W. GARBUTT
BY
*Percy P. Lantz*
ATTORNEY

May 26, 1959 C. W. GARBUTT 2,887,791
TOPOGRAPHICAL MAP AND METHOD OF MAKING SAME
Filed Feb. 13, 1956 2 Sheets-Sheet 2
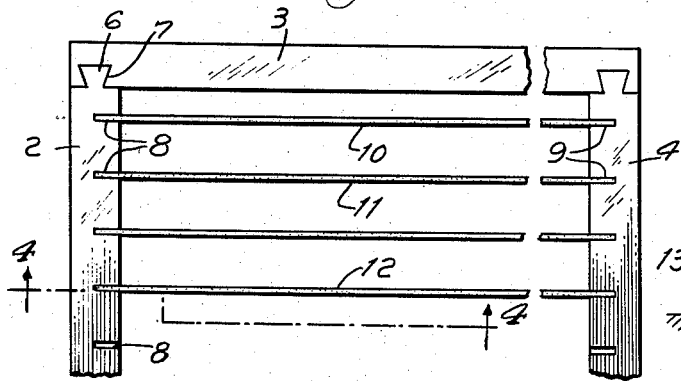
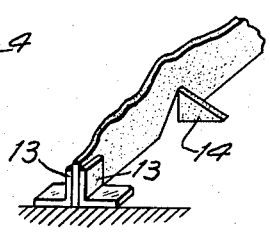
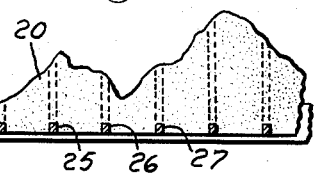
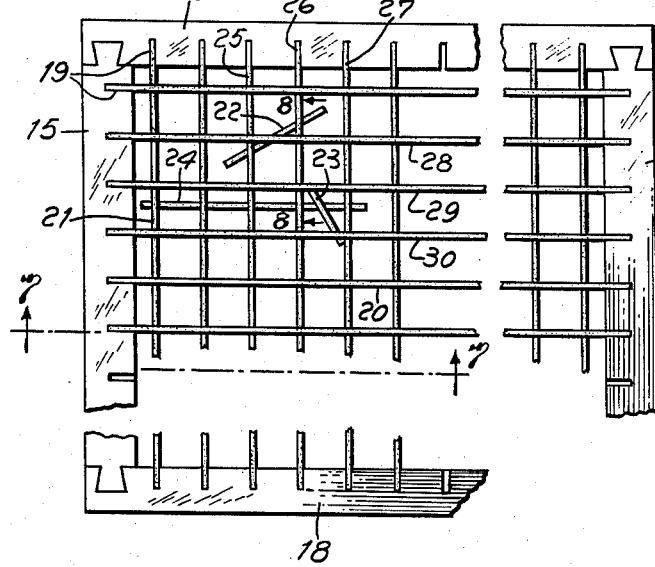
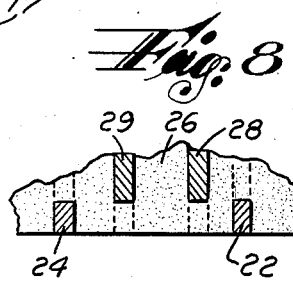
INVENTOR.
CAMERON W. GARBUTT
BY
ATTORNEY United States Patent Office 2,887,791
Patented May 26, 1959

2,887,791

TOPOGRAPHICAL MAP AND METHOD OF MAKING SAME

Cameron W. Garbutt, Carbondale, Ill.

Application February 13, 1956, Serial No. 564,959

3 Claims. (Cl. 35—41)

This invention relates to topographical maps and more particularly to kits from which children can easily make such maps.

While school children are readily attracted to projects such as making relief and topographical maps, it is seldom done because of the difficulty of working out elevations and distances in suitable proportions. Also it is time consuming for the teacher and is coupled with the difficulties of assembling proper materials. One of the objects of this invention, therefore, is to provide a kit from which children can take an active part in the making of topographical maps and wherein the task of determining relative distances and altitudes in pleasing proportions is either eliminated or greatly simplified.

Another object is to provide a kit of materials so prepared that children between the ages of about six and twelve years can follow simple instructions to make a suitably proportioned topographical map and thus learn quickly to understand and read such maps.

Still another object is to provide a completed topographical map and a relatively simple method for constructing same.

One of the features of the invention is to provide on a base board or sheet the configuration of a map of a given area and on another sheet a series of elevational strips, either painted or otherwise outlined, which can be cut or broken out and assembled in predetermined positions crosswise of the map. Means are provided for holding the strips edgewise on the mapped surface so that the upper edge provides a line relief across the map. With a series of such strips assembled in parallel and/or criss-cross relation, the upper edges present a complete relief outline of the mapped territory. The topography of the territory may be further emphasized by coloring the strips according to levels zones of elevation similarly as employed by cartographers. Such coloring for some maps may depend on the characteristic coloring of the area mapped and upon the season of the year portrayed. While these elevational strips are sufficient for many lessons in understanding topography, it may be desirable to continue the map making by filling in the areas between strips with sand or other material to present a continuous relief.

Another feature is the selective spacing of the strips, the relatively flat areas being represented by widely spaced strips while the mountainous areas are provided with strips closely spaced. This may involve the provision of short strips for areas where more elevational points are required. The location of the short strips is determined by providing interlocking notches on the strips together with the corresponding numbers, letters or other indications. After these strips are completely assembled, sand, papier-mache, clay, plaster of Paris or other suitable material may be filled in between strips and smoothed down according to the established elevations formed by the upper edges of the strips.

The foregoing and other objects and features will be best understood by reference to the accompanying drawings wherein:

Fig. 3 is a fragmentary portion in plan of the map shown in Fig. 1;

Fig. 4 is a cross-sectional view taken along the line 4—4 of Fig. 3;

Fig. 5 is an end view of an elevational strip showing an alternative way of supporting it on the map;

Fig. 6 is a fragmentary plan view of an alternative construction for the map; and Figs. 7 and 8 are cross-sectional views taken along lines 7—7 and 8—8 of Fig. 6.

Figure 1:
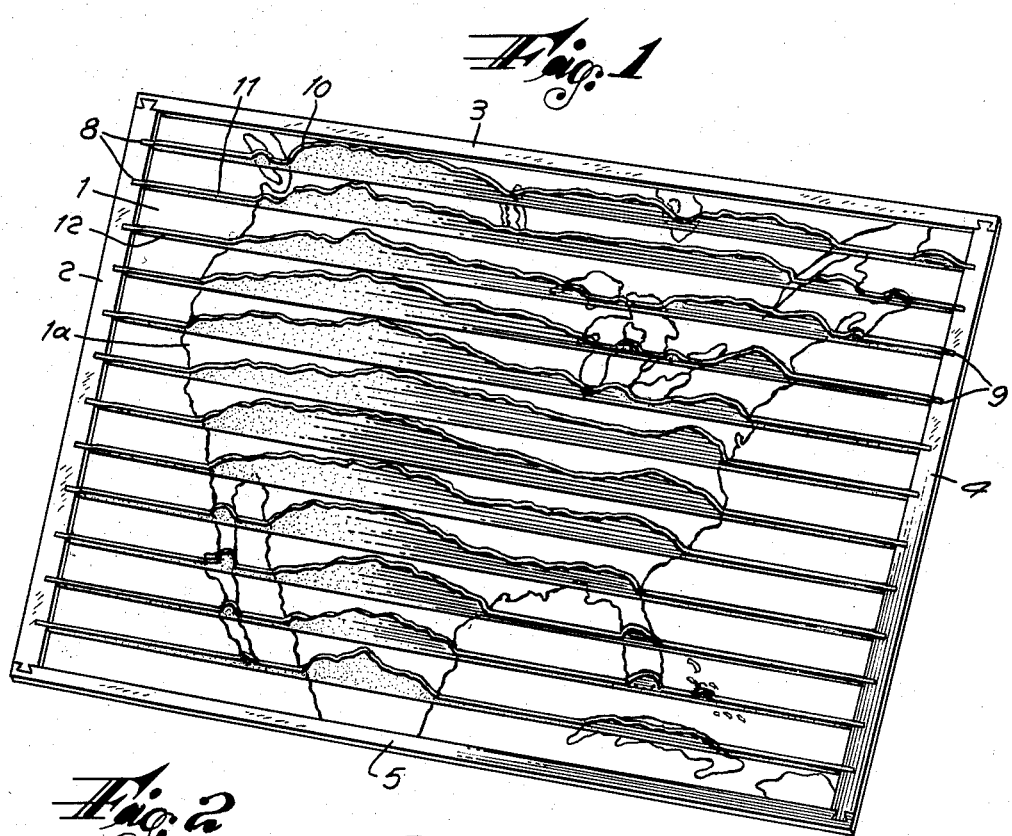
Fig. 1 is a view in perspective of a completed map according to one embodiment of this invention.
Figure 2:
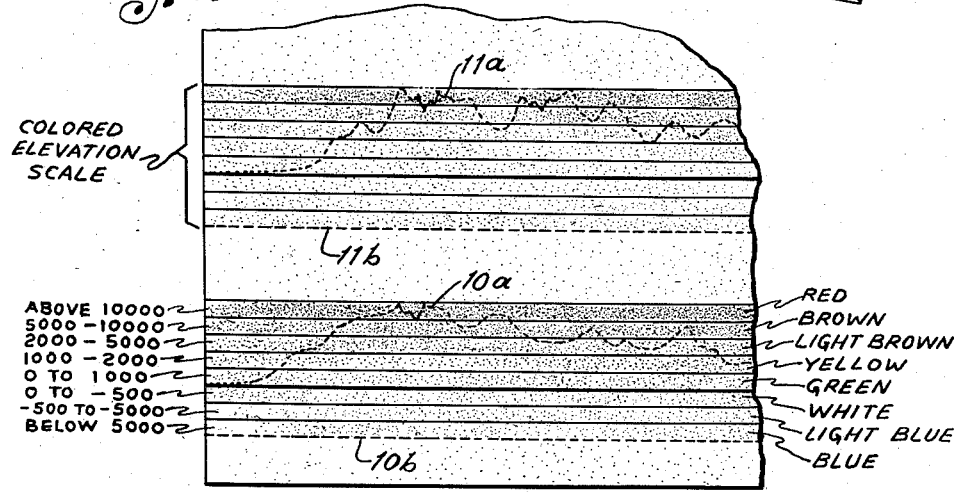
Fig. 2 is a fragmentary plan view of a sheet containing printed elevational strips.

Referring to Fig. 1 of the drawings, an assembled map is shown in perspective. The map comprises a base sheet 1, either of paper or pressed board, onto which the configuration of a map 1a is either printed or otherwise outlined. On this base sheet is a frame comprising side members 2, 3, 4 and 5 which are assembled at the corners by tongue and groove joints 6 and 7. While tongue and groove joints are shown, it should be understood that any suitable means may be provided to secure the frame members in position on this base sheet. The two frame members 2 and 4 are each provided with a corresponding row of notches 8 and 9. A plurality of elevation strips 10, 11, 12, etc. are receivable in the notches 8 and 9 thus spacing the strips in parallel relation crosswise of the map, the notches serving to locate the strips and hold them edgewise so that the upper edges provide lines of elevation points across the map. These elevational strips may be precut or they may be formed on a sheet by printing or partial cutting by known stamping processes. Such a prepared sheet is shown in Fig. 2. Children may cut or break out the strips along the prepared outlines 10a, 10b, 11a, 11b etc. Where frame members are not provided the map may be marked for the strip locations and the strips held upright by pieces of Scotch tape and/or lug portions formed by cuts in the strip as indicated at 13 and 14 in Fig. 5. It is preferred, however, to employ a frame arrangement particularly when filling material is to be placed between the strips. For certain educational projects it may not be desired to fill in the spaces since the elevational strips may be viewed from perspective angles to perceive the terrain relief. Where the spaces are filled with material, the material, of course, is smoothed to follow the elevation contour indicated by the strips.

The material for the elevational strip must, of course, be sufficiently stiff so that it will stand up on its edge between points of support. As hereinbefore stated, the strips may best be colored according to predetermined levels of elevation, particularly if they are to be used without filling material. The strip material would, in this case, be colored by paints or impregnated with color pigments according to a plan substantially as follows:

Sea level and below ..... white from 0 to 500 ft., light blue between 500 ft. and 5000 ft. and deep blue below 5000 ft.
Above sea level to 1000 ft. green.
1000 ft. to 2000 ft. ....... yellow.
2000 ft. to 5000 ft. ....... light brown.
5000 ft. to about 10,000 ft. brown.
Above 10,000 ft. .......... red.

Paper material having such coloring impregnated therethrough and in gradations according to the elevation scale may be used, strips in Figs. 2 and 4 being illustrative. Lakes, however, would be indicated in their location by applying a light blue color to the upper edge portions of the strips which overlie lakes that are above sea level. Any desired color scheme, of course, may be used in order to get a desired topographical effect.

Where strips are preformed, they may be made of plastic material colored according to an elevational plan similar to the one set forth above. Lakes would then be represented by blue paint or by blue colored strips corresponding in size to the depth and width of the lake, the strips being glued or otherwise secured in location on one or more of the main strips overlying the lake area of the map.

Where the map area is large the strips may be curved to follow selected lines of longitude and/or latitude. Such curved strips, however, would best be preformed, plastic being useful for this purpose.

In Figs. 6–8 a modified form of map construction is illustrated. The frame members 15, 16, 17 and 18 are precut and assembled, similarly as described in Figs. 1 and 3. The opposed frame members 15—17 and 16—18 are provided with corresponding notches 19 to receive the ends of elevational strips. Where two strips cross each other such as strips 20 and 21 the strips are preferably notched to interlockingly receive each other. Where short strips are employed to provide additional elevational points in mountainous areas their locations are determined by notches suitably located in the longer strips. Three short strips 22, 23 and 24 are shown intersecting the longer strips 25—30. Fig. 8 shows a sectional view indicating the interlocking positioning of the short and long strips. The location of the short strips is indicated by appropriate marking on the long strips.

The map construction of Figs. 6–8 lends itself particularly for constructing continuous relief contours. Material such as sand, papier mache, clay, plaster of Paris or other suitable material may be placed between the strips and suitably moistened and smoothed down according to the numerous elevational points provided by the elevational strips.

While I have described above the principles of my invention in connection with specific apparatus, and particular modifications thereof, it is to be clearly understood that the description is made only by way of example and not as a limitation on the scope of my invention as set forth in the accompanying claims.

I claim:

1. A topographical map for a given geographical area comprising a flat map of said area, a frame disposed to surround said area, a plurality of card-like strips, each strip having a straight bottom edge and a top edge shaped to present elevational points in said area along one of a corresponding number of spaced lines crosswise of said area, each of said strips being varied in color from adjacent the bottom edge thereof to the top edge so that each elevational level is indicated by the same color gradation throughout the length of the strip, and said frame having notches at spaced points therealong to receive the ends of said strips to hold said strips in upright position along said corresponding lines so that the top edges thereof present in spaced relation the relief outline of said area.

2. A topographical map for a given geographical area comprising a group of card-like strips having the upper edges thereof shaped to present elevational points in said area along parallel lines spaced across said area, a second group of card-like strips having the upper edges thereof shaped to present elevational points in said area along parallel spaced lines crosswise of said first mentioned lines, at least certain of these strips of said groups being provided with notches which receive other of said strips to subdivide said area, additional strips of length shorter than the strips of said first and second groups, said shorter strips having the upper edges thereof representing additional points of elevation of special significance between the lines represented by the strips of said first and second groups, and said shorter strips and certain of the other of said strips having notches to interlock the strips of shorter length in positions where said additional points of elevation are located in said area.

3. A topographical map comprising a base for representing thereon a given geographical area, a plurality of card-like strips having one edge thereon shaped to represent elevational points of said area along one of a corresponding number of spaced lines crosswise of said area, each of said strips being varied in color crosswise thereof so that each elevational level is indicated by the same color gradation throughout the length of the strip, and means associated with said base for positioning said strips in upright position along said corresponding lines so that the elevational points thereof present in spaced relation a relief outline of said area.

References Cited in the file of this patent
UNITED STATES PATENTS

| | | |
|---|---|---|
| 298,812 | Anderson | May 20, 1884 |
| 772,343 | Diehl | Oct. 18, 1904 |
| 2,127,546 | Whittier | Aug. 23, 1938 |
| 2,242,631 | Stillman | May 20, 1941 |
| 2,743,535 | Hanks | May 1, 1956 |
| 2,756,054 | Strohm | July 24, 1956 |

FOREIGN PATENTS

| | | |
|---|---|---|
| 332,359 | Germany | Jan. 31, 1921 |
| 30,018 | Great Britain | 1910 |
| 598,336 | Great Britain | Feb. 16, 1948 |
| 73,203 | Switzerland | Sept. 1, 1916 |